United States Patent [19]

Quasney, Sr.

[11] Patent Number: 4,803,748
[45] Date of Patent: Feb. 14, 1989

[54] CLEANING UNIT FOR SOLDERING IRON OR SOLDER EXTRACTOR TIPS

[75] Inventor: Robert S. Quasney, Sr., Pasendena, Md.

[73] Assignee: Pace Incorporated, Laurel, Md.

[21] Appl. No.: 158,754

[22] Filed: Feb. 22, 1988

[51] Int. Cl.4 .................... B05C 11/105; B23K 37/00
[52] U.S. Cl. .................................... 15/104.92; 15/105
[58] Field of Search ............... 15/104.92, 105; 228/57

[56] References Cited

U.S. PATENT DOCUMENTS

| | | | |
|---|---|---|---|
| 3,609,791 | 6/1969 | Siegel et al. | 15/114 |
| 3,977,036 | 8/1976 | Vanyi | 15/104.92 X |
| 4,118,821 | 10/1978 | Kuhn | 15/104.92 |
| 4,176,778 | 12/1979 | Fortune | 15/104.92 X |

Primary Examiner—Chris K. Moore
Attorney, Agent, or Firm—Gerald J. Ferguson, Jr.

[57] ABSTRACT

A cleaning unit for cleaning the tip of a soldering iron or solder extractor or the like, the unit including a well for containing a liquid which will shock surface oxides from the tip; a sponge disposed within the well for absorbing the liquid, the sponge having an opening extending therethrough; and a nonmetallic, preferably porous liner in contact with the surface of the opening in the sponge, the nonmetallic liner having an abrasive surface whereby particulate matter may be removed from the tip by the abrasive surface by rubbing the tip thereagainst and said surface oxides may be removed by being brought into contact with the liquid absorbed in the sponge.

6 Claims, 1 Drawing Sheet

CLEANING UNIT FOR SOLDERING IRON OR SOLDER EXTRACTOR TIPS

BACKGROUND AND SUMMARY OF THE INVENTION

This invention relates to devices for cleaning the tip of a soldering iron or solder extractor.

A cleaning unit of the above type is described in U.S. Pat. No. 3,609,791 granted to William J. Siegel et al., which patent is assigned to the assignee of this subject application and which is incorporated herein by reference. Soldering irons and solder extractors require care and maintenance and particularly those commonly employed in the field of rework and repair of electrical circuitry. That is, the tip of a soldering iron or solder extractor becomes fouled with a surface film of oxides and sometimes flux. In addition, particles of solder and flux adhere to the tip. Such fouling of the soldering iron hinders subsequent formation of proper solder connections. Accordingly, the tip should be cleaned periodically, especially during the course of forming numerous solder connections.

In the above mentioned U.S. Pat. No. 3,609,791, a separate wire bristle brush is employed to remove adhering particles and flux by wiping the tip against the brush. Although the wire brushing removes discrete particles from the tip, such brushing usually fails to remove the film of oxide therefrom. A separately mounted sponge is thus used to remove this film. That is subsequent to the wire brushing, the solder iron is heated, if not already hot, and then the tip is wiped gently across the top of the sponge. Contact between the hot soldering tip and the wet sponge shock cools the surface of the tip cracking away therefrom any oxide film present thereon.

Although the foregoing method and device is suitable for cleaning soldering iron or extractor tips in some applications, it has two shortcomings, the first of these being the metallic, wire brush for removing particulate matter from the tip. That is, the soldering iron tips are usually made from a copper containing alloy, the tip typically being at least plated with a material such as iron to prevent oxidation of the copper core. In a solder extractor nickel layer is formed on the copper tip. However, the wire brush of the above device tends to remove portions of the plating and accordingly, there is a strong tendency for the copper constituting the tip to be exposed to solder and flux and thus be oxidized whereby the useful life of the tip is substantially shortened since such oxidation can eventually result in disintegration of significant portions of the tip. Moreover, the disintegrated portions tend to become jagged whereby the jagged portions may damage the electrical circuitry.

Another shortcoming of the above-discussed prior art device is that the wire brush station and the sponge station are provided at separate places on the cleaning unit. Accordingly, the amount of room required for the cleaning unit becomes somewhat substantial. This tends to be a drawback in some rework and repair applications where space must be optimally utilized.

Accordingly, a primary object of this invention to provide an improved cleaning unit for tips of soldering irons and solder extractors wherein both particulate matter and surface oxides may be removed from the tip with little, if any, danger of removing the protective plating on the tip.

It is a further primary object of this invention to provide a cleaning unit of the above type where the removal of the particulate matter and the surface oxides may occur at the same place and at the same time thus optimizing space utilization while at the same time optimizes the efficiency of the tip cleaning process.

These and other objects of the invention will become apparent from the following description of the invention taken together with the drawing.

DETAILED DESCRIPTION OF PREFERRED EMBODIMENTS OF THE INVENTION

Figure 1:
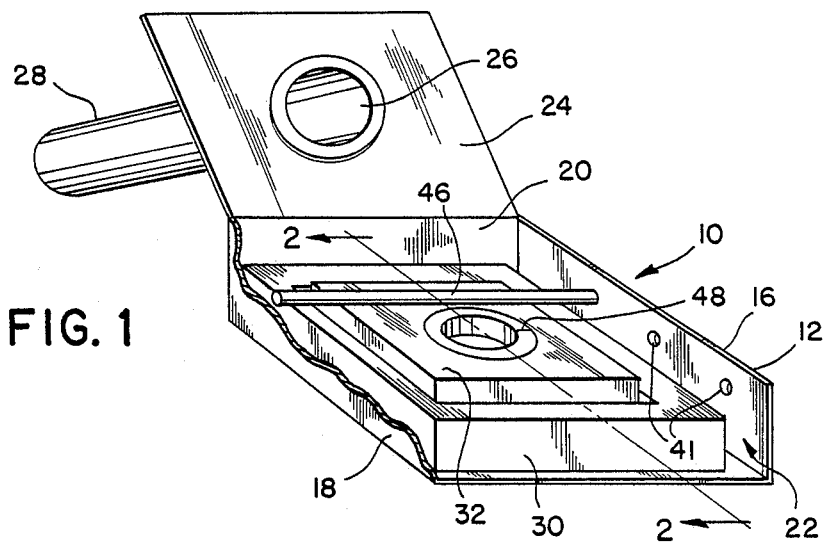
FIG. 1 is a broken away, perspective view of an illustrative cleaning unit in accordance with the invention.

Reference should now be made to the drawing where like reference numerals refer to like parts.

Figure 2:
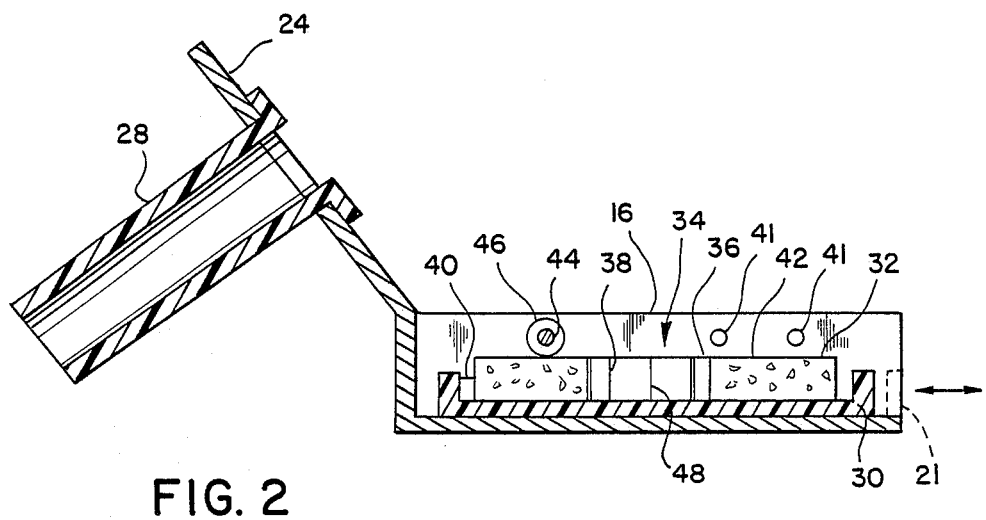
FIG. 2 is a cross-sectional view taken along the line 2—2 of FIG. 1.

Referring to FIGS. 1 and 2, the cleaning unit 10 comprises a container 12 made of any appropriate material such as stamped steel, aluminum, or plastic, the container having two side walls 16 and 18 and a rear wall 20, the side wall 18 being broken away to facilitate illustration of the invention. The front end 22 of the container may be open or partially closed by providing a shortened front wall indicated by dotted lines at 21 in FIG. 2. The rear wall 20 has appended thereto a plate 24, the plate having an opening 26 for receiving a cylindrical member 28 in which a soldering iron or extractor may be inserted. Soldering iron or extractor receptacle 28 per se is known and does not form a part of the invention except, in combination, with the other advantageous features of the invention, as now described.

Removably insertable through the open end 22 of container 12 is a well 30 which may be made of any appropriate material such as stamped steel, aluminum, plastics, etc. Well 30 has a sponge 32 disposed therein the sponge having an opening 34 therein where the wall of opening 34 is lined with a nonmetallic, preferably porous liner 36 having a mildly abrasive surface 38. The liner may be comprised of a material such as a Fiberglass composite commercially available from the Varflex Corporation under the trademark Varglas. It may also be a heat resistant plastic formed in a mesh-like configuration. The porosity of such liners facilitates passage of water therethrough from the sponge. Water 40 is indicated in the well in FIG. 2 whereby the sponge is maintained in a wet condition as is the abrasive surface 38 of liner 36. Holes 41 in sidewall 16 and 18 may be utilized to attach unit 10 to a power and/or vacuum supply (not shown).

In operation, the tip of a solder extractor or soldering iron is inserted in opening 34 and is gently brushed against the nonmetallic, mildly abrasive surface 38 of liner 36. Accordingly, due to the nonmetallic, abrasive surface of the liner, particulate matter is removed from the tip without removing portions of the tip plating. Moreover, due to the porosity of the liner, the water originating from the sponge comes in contact with the surface of the tip to shock oxides loose therefrom. Accordingly, once the soldering iron tip is removed from opening 34, a thoroughly clean soldering iron or extractor is now available for use.

Alternatively, the nonmetallic liner need not be porous as long as the surface 38 thereof is sufficiently abrasive. That is, in this alternative embodiment, the tip is inserted in opening 34 and gently rubbed against the abrasive surface 38 to remove particulate matter therefrom. The tip is then gently rubbed against the upper surface 42 of sponge 32 to shock loose oxides therefrom to thus provide a clean iron or extractor ready for use. In either embodiment of the invention, it can be appreciated removal of particulate matter and surface oxides occurs at substantially the same place and time and thus substantial economy of space and time is realized. Moreover, the partial front wall 21 assists in retaining the well 30 in place during a cleaning procedure.

In accordance with a further feature of the invention, a bar 44 (FIG. 2) extends between side walls 16 and 18 of container 12. Disposed around the bar is a nonmetallic liner 46 which may be made of the same material as that comprising liner 36. Accordingly, the tip may also be gently rubbed over liner 46 to further facilitate removal of particulate matter. Moreover, the bar 36 is so positioned within container 12 that when the well 30 with sponge 32 therein is inserted into the forward open end of container 12, the bar 44 with liner 46 will retain the well and the scope within the container to the extent that vertical movement of the sponge and well are inhibited by the bar as can be appreciated from FIG. 2. Horizontal movement of the well 30 and sponge 22 can be effected in the direction of the double-headed arrow of FIG. 2 to maintain the unit by, for example, replenishing water 40 in the well, replacing sponge 32 or liner 36, or any other maintenance which may be required.

Liner 38 is preferably removably insertable in opening 34 of sponge 32. Thus, the liner 36 may constitute a strip of the Varglas sleeving described above where the ends of the strip meet at 48. That is, the strip is rolled up into the configuration of the opening 34 and then inserted in the opening to provide the nonmetallic abrasive liner for opening 34 where the liner may be porous, as discussed above. Alternatively, the length of the strip may be such that it exceeds the circumference of opening 34 so that after being rolled up and inserted into opening 34, a portion of the strip will overlay another portion thereof.

Other modifications of the invention will be apparent to those of ordinary skill in this art. Accordingly, such modifications are included within the scope of this invention as defined by the claims appended hereto.

What is claimed is:

1. A cleaning unit for cleaning the tip of a soldering iron or solder extractor or the like, said unit comprising
   a well for containing a liquid which will shock surface oxides from said tip;
   a sponge disposed within the well for absorbing said liquid, said sponge having an opening extending therethrough; and
   a nonmetallic liner in contact with the surface of the opening in the sponge, said nonmetallic liner having an abrasive surface
   whereby particulate matter may be removed from said tip by said abrasive surface by rubbing the tip thereagainst and said surface oxides may be removed by being brought into contact with the liquid absorbed in the sponge.

2. A cleaning unit as in claim 1 where said liner is also porous to facilitate passage of said liquid through the liner to said abrasive surface thereof.

3. A cleaning unit as in claim 1 where said liquid is water.

4. A cleaning unit as in claim 1 including a container for said well, said container having (a) a base, (b) two side walls and a rear wall upwardly extending from the base, and (c) an at least partially open open forward end for removably receiving the well with the sponge therein.

5. A cleaning unit as in claim 4 including a rod extending between said side walls for inhibiting vertical movement of said well with the sponge therein from the container.

6. A cleaning unit as in claim 5 where said bar has disposed thereon a nonmetallic liner for further facilitating the removal of particulate matter from the tip.

* * * * *